UNITED STATES PATENT OFFICE.

SAML. F. HILTON, OF PROVIDENCE, ASSIGNOR TO HIMSELF AND W. D. HILTON, OF CRANSTON, RHODE ISLAND.

IMPROVEMENT IN CEMENT FOR LEATHER AND OTHER SUBSTANCES.

Specification forming part of Letters Patent No. 33,065, dated August 13, 1861.

*To all whom it may concern:*

Be it known that I, SAMUEL F. HILTON, of Providence, in the county of Providence and State of Rhode Island, have invented a new and useful Cement for Various Purposes; and I do hereby declare the same to be fully described in the following specification.

The two materials employed and the proportions in which they are used are as follows, viz: three pounds of gelatine and one pound of tannin. The process of combining them may be thus described: Dissolve the gelatine in about one wine gallon of water at 212° Fahrenheit. Dissolve the tannin in one-half a gallon of alcohol at ordinary atmospheric temperature. Next throw the two solutions together and suffer them to stand until cold and precipitation of the combination of the tannin and gelatine takes place. Next heat the combined solutions to about 106° Fahrenheit, and afterward agitate or stir them until they cool to atmospheric temperature. This latter will produce a separation of the alcohol and water from the combined tannin and gelatine. Furthermore, it modifies the said composition of tannin and gelatine, or thoroughly effects the combination of the two.

The composition thus formed has been found superior to any other kind of cement for uniting leather belting or strips of leather together. As it is insoluble in either oil or water, it is found to be especially adapted for belts or bands which are to be run in a moist or damp place.

In applying my said composition for the purpose of attaching or connecting the ends of leather belting or various other articles together, it is to be put into any suitable vessel and raised to a boiling heat, and then applied to the parts or surfaces to be united by means of a brush or in any other convenient means. After the said two parts to be united have had a portion of the cement applied to them they should be placed between a clamp or pressing apparatus and allowed to remain until the cement becomes cold.

Having described my invention, what I claim as an improved article of manufacture is—

My improved cement as made by combining the two materials hereinbefore first mentioned in manner and in the proportions substantially as set forth.

SAML. F. HILTON.

Witnesses:
 WM. D. HILTON,
 F. P. HALE, Jr.